US009617007B2

(12) United States Patent
Hoelling et al.

(10) Patent No.: US 9,617,007 B2
(45) Date of Patent: Apr. 11, 2017

(54) SYSTEM AND METHOD FOR CONTROLLING AN AIRCRAFT COOLING SYSTEM

(75) Inventors: Marc Hoelling, Hamburg (DE); Werner Rothammer, Buchholz (DE); Jan Dittmar, Buxtehude (DE); Carsten Colberg, Hamburg (DE); Wilson Willy Casas Noriega, Hamburg (DE); Ozan Uluc, Hamburg (DE); Sebastian Roering, Hamburg (DE); Holger Wolf, Lauenbrueck (DE)

(73) Assignee: Airbus Operations GmbH (DE)

( * ) Notice: Subject to any disclaimer, the term of this patent is extended or adjusted under 35 U.S.C. 154(b) by 549 days.

(21) Appl. No.: 13/434,396

(22) Filed: Mar. 29, 2012

(65) Prior Publication Data

US 2012/0279680 A1  Nov. 8, 2012

Related U.S. Application Data

(63) Continuation of application No. PCT/EP2010/005912, filed on Sep. 28, 2010.

(30) Foreign Application Priority Data

Sep. 29, 2009 (DE) .................. 10 2009 043 429
Nov. 13, 2009 (DE) .................. 10 2009 053 094

(51) Int. Cl.
*G05B 13/00* (2006.01)
*B64D 13/08* (2006.01)
(Continued)

(52) U.S. Cl.
CPC .............. *B64D 13/08* (2013.01); *B64D 13/00* (2013.01); *B64D 2013/0655* (2013.01); *Y02T 50/44* (2013.01); *Y02T 50/56* (2013.01)

(58) Field of Classification Search
CPC ......... Y02T 50/44; Y02T 50/56; B64D 13/08; B64D 2013/0655; B64D 13/00;
(Continued)

(56) References Cited

U.S. PATENT DOCUMENTS 6,401,473 B1 * 6/2002 Ng et al. .................. 62/239
7,308,614 B2 * 12/2007 Kojori .................. 714/47.2
(Continued)

FOREIGN PATENT DOCUMENTS

DE    103 61 645 A1    8/2005
DE    103 61 709 A1    8/2005
(Continued)

OTHER PUBLICATIONS

International Search Report and Written Opinion, Jun. 1, 2011, PCT/EP2010/005912.

*Primary Examiner* — Robert Fennema
*Assistant Examiner* — Thomas Stevens
(74) *Attorney, Agent, or Firm* — Taft Stettinius & Hollister LLP

(57) ABSTRACT

A system for controlling a cooling system comprises an operating state detection unit adapted to detect operating signals characteristic of the operating state of the cooling system and/or the operating state of a plurality of cooling energy consumers to be supplied with cooling energy by the cooling system and a database in which priority data dependent on the operating state and characteristic of the priority to be given to the cooling energy consumers in terms of the cooling energy to be supplied in various operating states of the cooling system and/or of the cooling energy consumers, is stored for a plurality of cooling energy consumers to be supplied with cooling energy by the cooling system.

11 Claims, 1 Drawing Sheet

Related U.S. Application Data

(60) Provisional application No. 61/246,662, filed on Sep. 29, 2009, provisional application No. 61/261,025, filed on Nov. 13, 2009.

(51) Int. Cl.
  *B64D 13/00* (2006.01)
  *B60H 1/00* (2006.01)
  *F25B 29/00* (2006.01)
  *F28F 13/00* (2006.01)
  *B64D 13/06* (2006.01)

(58) Field of Classification Search
  CPC ...... G06F 1/1698; G06F 1/1686; G06F 1/166; G06F 1/1643; G06F 1/1613
  USPC .......................... 165/11.1, 263–269; 700/276
  See application file for complete search history.

(56) References Cited

U.S. PATENT DOCUMENTS

| | | |
|---|---|---|
| 7,802,732 B2 | 9/2010 | Scherer et al. |
| 2007/0137234 A1 | 6/2007 | Zywiak et al. |
| 2008/0053126 A1* | 3/2008 | Ebigt ................... B60N 2/24 62/237 |
| 2008/0134703 A1* | 6/2008 | Scherer et al. ............... 62/244 |
| 2008/0283663 A1* | 11/2008 | Space et al. ............... 244/118.5 |
| 2009/0000328 A1 | 1/2009 | Scherer et al. |
| 2009/0030555 A1* | 1/2009 | Gray ........................... 700/277 |
| 2009/0126900 A1 | 5/2009 | Scherer et al. |
| 2010/0096118 A1* | 4/2010 | Scherer ................. B64D 13/00 165/253 |
| 2011/0077811 A1* | 3/2011 | Karimi .................... B60L 1/00 701/22 |

FOREIGN PATENT DOCUMENTS

| | | |
|---|---|---|
| DE | 10 2005 061 599 A1 | 6/2007 |
| EP | 1 801 009 A2 | 6/2007 |
| WO | WO 2005/063567 A1 | 7/2005 |
| WO | WO 2005/063575 A1 | 7/2005 |
| WO | WO 2007/087974 A1 | 8/2007 |

* cited by examiner

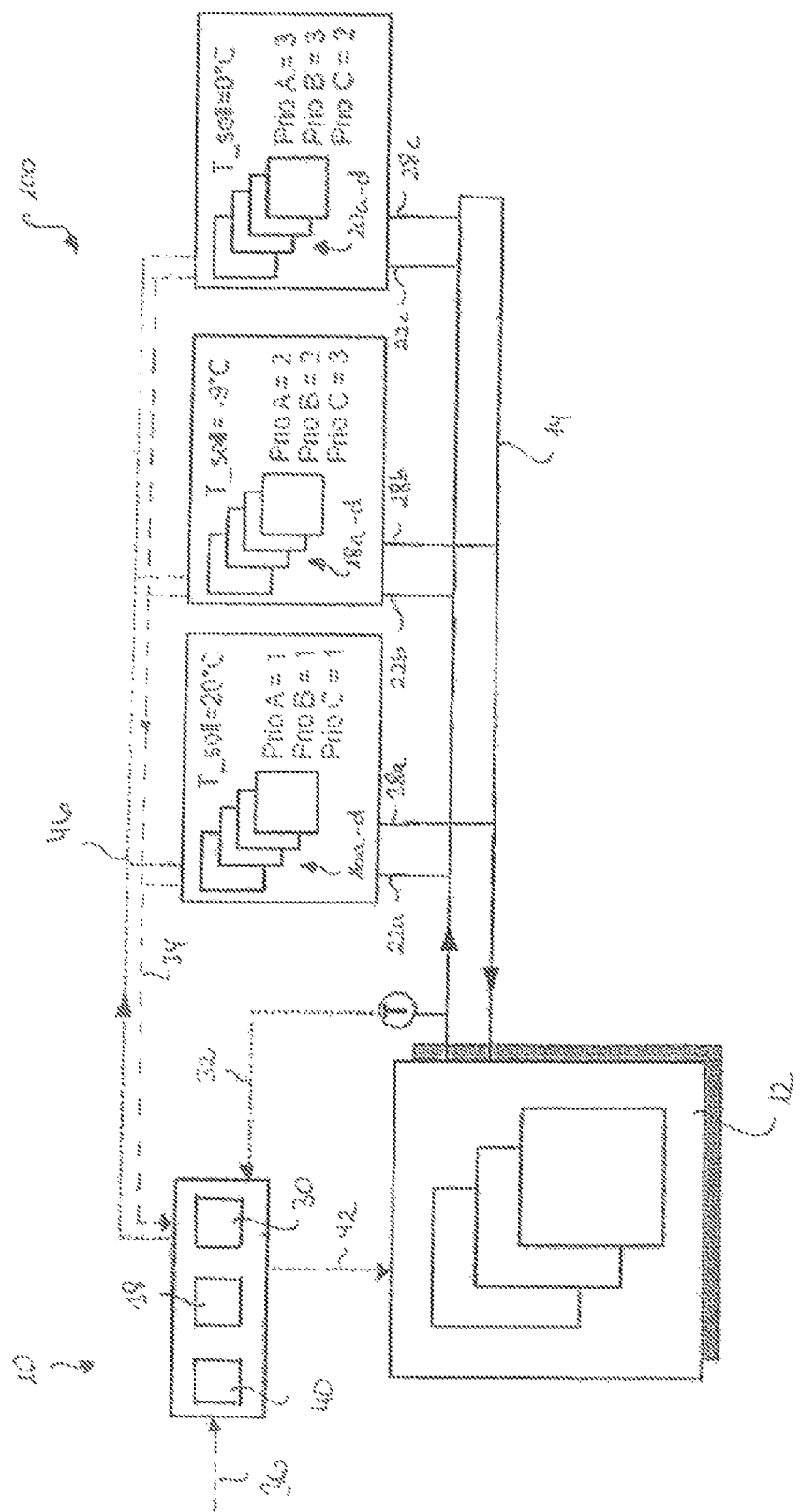

SYSTEM AND METHOD FOR CONTROLLING AN AIRCRAFT COOLING SYSTEM

The present application is a continuation patent application of PCT/EP2010/005912, filed Sep. 28, 2010, which claims the benefit of U.S. Provisional Application Nos. 61/246,662, filed Sep. 29, 2009 and 61/261,025, filed Nov. 13, 2009 and claims priority to German Patent Application Nos. 10 2009 043 429.1, filed Sep. 29, 2009 and 10 2009 053 094.0, filed Nov. 13, 2009 all of which are incorporated herein by reference.

The invention relates to a system and a method for controlling a cooling system provided for use especially on board an aircraft. The invention also relates to an aircraft cooling system.

Modern aircraft, in particular commercial aircraft, comprise a plurality of components and systems, which have to be cooled depending on their configuration, their function and their operating state, if applicable taking account of the ambient conditions. In aircraft currently in use, the various devices to be cooled that are present on board the aircraft are frequently supplied with cooling energy by individual cooling systems assigned to the aircraft devices to be cooled. The individual cooling systems are usually specially adapted in respect of their construction and their operation to the cooling requirement demands made by the aircraft devices to be cooled. To be able to reliably ensure proper functioning of the aircraft devices to be cooled in all operating situations of the aircraft, the individual cooling systems assigned to the aircraft devices to be cooled must therefore be dimensioned and designed so that even at peak load times, i.e. times of maximum cooling requirement of the aircraft devices to be cooled, they facilitate an adequate provision of cooling energy to the aircraft devices to be cooled. The individual cooling systems have a relatively high weight, therefore, as well as a relatively high installation space requirement. Moreover, the operation of the individual cooling systems is very energy-intensive, especially at peak load times.

Furthermore, it is known to equip aircraft with central cooling systems, which comprise a central cold production device. Cooling energy generated by the cold production device in operation is supplied, for example by means of a cooling circuit, in which a suitable coolant circulates, to a plurality of cooling energy consumers. The supply of cooling energy to the individual consumers must be adapted in this case to the structure- and function-dependent cooling energy requirement respectively of the consumers. An adjustment of the supply of cooling energy to the consumers is possibly also necessary depending on the operating state of the consumers and/or the ambient conditions. The central control algorithms and logics of a central aircraft cooling system are relatively complex, therefore. System changes or system expansions are consequently very costly and also increase the fault susceptibility of the system.

The object of the invention is to provide a simplified system and method for controlling a cooling system provided especially for use on board an aircraft. The object of the invention is also to provide an aircraft cooling system equipped with a simplified control system.

This object is achieved by a system for controlling a cooling system with the features of claim 1 provided especially for use on board an aircraft, a method for controlling a cooling system provided especially for use on board an aircraft with the features of claim 6 and a cooling system with the features of claim 11.

A system according to the invention for controlling a cooling system provided, in particular, for use on board an aircraft comprises an operating state detection unit, which is adapted to detect operating state signals characteristic of the operating state of the cooling system and/or the operating state of a plurality of cooling energy consumers to be supplied with cooling energy by the cooling system. Cooling energy consumers to be supplied with cooling energy by the cooling system may be any components or systems present on board the aircraft, such as e.g. electrical or electronic devices, but also parts of a passenger cabin or a cargo hold of the aircraft. The signals detected by the operating state detection unit may be supplied, for example, by sensors assigned to the cooling system or the cooling energy consumers. These sensors may be formed as temperature sensors, but also as sensors that detect performance parameters characteristic of the operating state of the cooling system or the cooling energy consumers. Furthermore, signals may be supplied to the operating state detection unit that are characteristic of the ambient conditions, for example the ambient temperature, the air humidity in the environment etc.

The control system according to the invention further comprises a database, in which operating-state-dependent priority data are stored for a plurality of cooling energy consumers to be supplied with cooling energy by the cooling system, which data are characteristic of the priority to be given to the cooling energy consumers in terms of the cooling energy to be supplied in various operating states of the cooling system and/or of the cooling energy consumers. In other words, the database contains data that indicate in which operating states of the cooling system and/or of the cooling energy consumers a higher or lower priority is to be given to the individual cooling energy consumers compared with other cooling energy consumers in terms of the cooling energy to be supplied.

The priority data may be filed in the database in the form of a look-up table, for example. In addition or alternatively to this, however, the priority data may be stored in the database also in parametric form. For example, representation of the priority data in the database in the form of equations is possible, into which corresponding operating state parameters of the cooling system and/or of the cooling energy consumers may be inserted. In an arrangement of this kind, the control system preferably comprises a computer unit, which is adapted to determine with reference to operating state data for the cooling system and/or the cooling energy consumers, which data are determined by the operating state detection unit, and with reference to the equations stored in the database, the priority data required in the control operation of the control system.

Finally, the control system according to the invention is equipped with a control signal generation unit, which is adapted to generate control signals controlling the supply of cooling energy to the cooling energy consumers to be provided with cooling energy by the cooling system in accordance with the operating state signals detected by the operating state detection unit and the priority data stored in the database. The control signals generated by the control signal generation unit may be supplied to valves, for example, which are arranged in a coolant circuit of the cooling system and control the supply of cooling energy to the cooling energy consumers supplied with cooling energy by the cooling system. In addition or alternatively to this, however, the control signal generation unit may also be adapted to generate control signals that serve to control the cooling energy consumption of the cooling energy consumers. For example, the control signal generation unit may emit control signals by means of which the temperature of a coolant is controlled following the delivery of cooling energy to a cooling energy consumer. The control signals generated by the control signal generation unit may be supplied to components of the cooling system, such as e.g. the valves controlling the supply of cooling energy to the cooling energy consumers, and/or directly to the cooling energy consumers. Alternatively to this, however, the control signals of the control signal generation unit may also be supplied to local controllers of the components of the cooling system and/or of the cooling energy consumers that control the supply of cooling energy to the cooling energy consumers.

The control system according to the invention may serve solely to control the supply of cooling energy to the cooling energy consumers supplied with cooling energy by the cooling system. In addition to this, however, the control system may also be adapted to exert influence on the operation of the cooling energy consumers. For example, it can be brought about by suitable control signals emitted by the control signal generation unit of the control system that the output of a cooling energy consumer, to which less cooling energy or no cooling energy is supplied under the control of the control system according to the invention in a certain operating state of the cooling system and/or of the cooling energy consumer, is reduced. It is understood that, if necessary, switching off of the cooling energy consumer is also possible. The control signals emitted by the control signal generation unit of the control system may have a direct influence on the operation of the cooling energy consumers, wherein the control signals may be supplied directly to the cooling energy consumers or local controllers assigned to the cooling energy consumers. Alternatively to this, however, indirect influencing of the operation of the cooling energy consumers by the control signals emitted by the control signal generation unit is also conceivable. For example, the operation of the cooling energy consumers may be adapted by local controllers assigned to the cooling energy consumers to a certain cooling energy supply to the cooling energy consumers or the temperature development of the cooling energy consumers can be adjusted in the case of a certain supply of cooling energy to the cooling energy consumers.

The control system according to the invention may be used in a cooling system that comprises several cold production devices assigned to individual or several cooling energy consumers. The control system according to the invention may be used particularly advantageously, however, in a cooling system with a central cold production device, which supplies a plurality of cooling energy consumers with cooling energy.

The control system according to the invention facilitates operating-state-dependent prioritization of cooling energy consumers in terms of the cooling energy to be supplied and consequently an optimized distribution of the cooling energy provided by the cooling system to the cooling energy consumers. Due to this it is no longer necessary to dimension the cooling system so that it is capable in all operating states of the cooling system and/or of the cooling energy consumers of covering the maximum cooling energy requirement of all cooling energy consumers. Rather the cooling system only has to be able to generate in all operating states of the cooling system and/or of the cooling energy consumers an amount of cooling energy that takes account of the priority of the individual cooling energy consumers. As a result, the maximum cooling energy to be provided by the cooling system can be reduced and the system thus designed with a smaller cooling capacity. This results in a lower system weight, a lower energy requirement and a lower cooling air requirement, which in the case of an aircraft cooling system, to which the cooling air is normally supplied through suitably dimensioned ram air inlets, leads to a reduction in the air resistance of the aircraft in flight operation and thus to a reduction in the fuel consumption of the aircraft.

Control of the cooling energy supply to the cooling energy consumers with reference to priority data stored in a database facilitates a considerable simplification of the central system control, especially in a cooling system that supplies a plurality of cooling energy consumers with cooling energy. In particular, the logics implemented in the central control software of the system can be designed much more simply. This also facilitates simplified integration of new cooling energy consumers into the system control, as the basic structure and basic functionality of the control software does not have to be changed. Furthermore, no modification of the general architecture of the cooling system is necessary for implementation of the control system according to the invention. In fact, components of the cooling system that are present anyway, such as e.g. local controllers assigned to the individual cooling energy consumers or valves present in the cooling energy consumers can be used to implement the control signals emitted by the control signal generation unit of the control system according to the invention.

Finally, the control system according to the invention increases safety, especially when used in an aircraft cooling system, as due to the operating-state-dependent prioritization of cooling energy consumers in the supply of cooling energy, it can be ensured that in certain operating states of the cooling system and/or of the cooling energy consumers, safety-relevant cooling energy consumers are always supplied with adequate cooling energy. The overall availability of important cooling energy consumers is thereby improved. The operating-state-dependent prioritization of individual cooling energy consumers in terms of the cooling energy to be supplied ultimately facilitates optimum utilization of the overall quantity of cooling energy provided by the cooling system. On the whole, an improved cooling performance of the cooling system can be realised thereby.

The operating state detection unit of the control system according to the invention is preferably adapted to detect operating state signals which are characteristic of the utilization state of the cooling system, the cooling requirement of at least one cooling energy consumer to be supplied with cooling energy by the cooling system and/or the ambient conditions. The utilization state of the cooling system may be determined, for example, by measuring the speed of compressors used in the cooling system and/or detecting the overall amount of cooling energy produced by the cooling system. To determine the overall amount of cooling energy produced by the cooling system, temperature measurements may be taken, for example, at various points in the cooling system. The cooling requirement of a cooling energy consumer may be determined, for example, with reference to suitable performance parameters of the cooling energy consumer and/or with reference to temperature measurements. Important parameters characterizing the ambient conditions are the ambient temperature, for example, and/or the air humidity in the environment.

The operating state detection unit is preferably adapted to determine with reference to the operating state signals detected whether the cooling system is in a normal operating state, in a fault mode state or in an operating start-up phase. An operating state of the cooling system may be classed as a normal operating state by the operating state detection unit, for example, if predetermined basic components of the cooling system are working normally. In contrast to this, the operating state detection unit may detect an operating state of the cooling system as a fault mode state if predetermined basic components of the cooling system fail or do not operate at a predetermined output. A certain time period from the start of the cooling system or an operating state of the cooling system in which predetermined basic components of the cooling system are still in a start-up operating mode can be defined as an operating start-up phase, for example.

In addition or alternatively to this, the operating state detection unit may be adapted to determine with reference to the operating state signals detected whether a cooling energy consumer is in a normal operating state or in a critical operating state. An operating state of a cooling energy consumer may be classed by the operating state detection unit as a normal operating state if the cooling energy consumer works normally and/or if a reduction in the output and thus the cooling energy consumption of the cooling energy consumer or even switching off of the cooling energy consumer is not critical for a higher-level system, for example an aircraft equipped with the cooling energy consumer. By contrast, a critical operating state of a cooling energy consumer may be an operating state in which, for example due to a lack of cooling, the cooling energy consumer is threatened with damage. Furthermore, an operating state in which the cooling energy consumer has to be operated to prevent the occurrence of a critical operating state in a higher-level system, for example an aircraft equipped with the cooling energy consumer, may be considered a critical operating state of a cooling energy consumer. A critical operating state of a cooling energy consumer may be detected by the operating state detection unit, for example, if a temperature of a cooling energy consumer exceeds a set target temperature.

In the database of the control system according to the invention, operating-state-dependent priority data may be stored for a plurality of cooling energy consumers to be supplied with cooling energy by the cooling system, which data are characteristic of the priority to be given to the cooling energy consumers in terms of the cooling energy to be supplied in a normal operating state of the cooling system, in a fault mode state and/or in an operating start-up phase of the cooling system. In other words, the database contains data that make it possible to prioritize the cooling energy consumers to be supplied with cooling energy by the cooling system differently in terms of the cooling energy to be supplied in a normal operating state of the cooling system, in a fault mode state and/or in an operating start-up phase of the cooling system.

For example, individual cooling energy consumers, for example cooling energy consumers that fulfil safety-relevant functions on board an aircraft, may enjoy top priority in all operating phases of the cooling system with reference to the priority data stored in the database. Further cooling energy consumers may by contrast be prioritized compared with other cooling energy consumers in terms of the cooling energy to be supplied in a normal operating state and/or a fault mode state of the cooling system, for example, but in the operating start-up phase be treated subordinately compared with these other cooling energy consumers in terms of the cooling energy supplied. Prioritization of this kind presents itself for example for cooling energy consumers which may fulfil important functions in a normal operating state and/or a fault mode state of the cooling system, but the lower cooling of which in the operating start-up phase of the cooling system has no negative consequences or only negligible ones.

In addition or alternatively to this, the operating-state-dependent priority data stored in the database may be data that are characteristic of the priority to be given to the cooling energy consumers in terms of the cooling energy supplied in a normal operating state and/or in a critical operating state of the cooling energy consumers. In other words, the operating-state-dependent priority data stored in the database may take account of the operating state of the cooling energy consumers in addition to or alternatively to the operating state of the cooling system, wherein it is preferably differentiated whether the cooling energy consumers are in a normal operating state and/or in a critical operating state.

Furthermore, a target temperature of a coolant to be supplied to the cooling energy consumers may be stored in the database of the control system according to the invention for a plurality of cooling energy consumers to be supplied with cooling energy by the cooling system. The target temperature stored in the database is preferably a desired minimum target temperature of the coolant to be supplied to the cooling energy consumers. Furthermore, the control system may be adapted to control the operation of a cold production device of the cooling system in such a manner that the cold production device cools the coolant to be supplied to the cooling energy consumers to a temperature that is adjusted to the lowest target temperature stored in the database of the cooling energy consumers supplied with cooling energy taking account of the operating-state-dependent priority data stored in the database in a certain operating state of the cooling system and/or of the cooling energy consumers.

In other words, the control system first determines with reference to the operating-state-dependent priority data stored in the database which cooling energy consumers are supplied with cooling energy in a certain operating state of the cooling system and/or of the cooling energy consumers detected with the aid of the operating state detection unit. Then the control system checks the target temperatures stored in the database of the coolant to be supplied to the cooling energy consumers for these cooling energy consumers and determines the lowest target temperature stored. Finally, the operation of the cold production device is adjusted to this lowest stored target temperature, i.e. the operation of the cold production device is controlled such that it cools the coolant to be supplied to the cooling energy consumer to a temperature that preferably corresponds to the lowest target temperature. By a configuration of the control system of this kind it is ensured on the one hand that none of the cooling energy consumers supplied with cooling energy by the cooling system is supplied with a coolant with too low a temperature. At the same time, however, an optimised utilization of the output of the cold production device is facilitated.

The operating-state-dependent priority data are stored in the database of the control system according to the invention preferably for predefined groups of cooling energy consumers to be supplied with cooling energy by the cooling system. In other words, the cooling energy consumers to be supplied with cooling energy by the cooling system are preferably divided into groups, wherein the grouping preferably already takes account of the prioritization of the cooling energy consumers in certain operating states of the cooling system and/or of the cooling energy consumers. For example, safety-relevant cooling energy consumers, to which highest priority is always to be given in terms of the cooling energy to be supplied, may be collected in a first group. A second group of cooling energy consumers may contain cooling energy consumers, for example, which are to be prioritized compared with other cooling energy consumers in terms of the cooling energy to be supplied in normal operation of the cooling system, but which are not necessarily to be cooled particularly quickly on start-up of the cooling system. The division of the cooling energy consumers into groups thus takes place preferably in a function-dependent manner and consequently independently of the physical location of the cooling energy consumers in the aircraft. In this way even cooling energy consumers that are arranged in some cases in a front part and in some cases in a rear part of the aircraft can be collected in a group, for example.

In a method according to the invention for controlling a cooling system provided, in particular, for use on board an aircraft, operating state signals are detected that are characteristic of the operating state of the cooling system and/or of the operating state of a plurality of cooling energy consumers to be supplied with cooling energy by the cooling system. Furthermore, for a plurality of cooling energy consumers to be supplied with cooling energy by the cooling system, operating-state-dependent priority data are stored that are characteristic of the priority to be given to the cooling energy consumers in various operating states of the cooling system and/or of the cooling energy consumers in terms of the cooling energy supplied. Finally, the control signals controlling the cooling energy supply to the cooling energy consumers to be supplied with cooling energy by the cooling system are generated in accordance with the detected operating state signals and the stored priority data.

It is preferably determined with reference to the detected operating state signals whether the cooling system is in a normal operating state, in a fault mode state or in an operating start-up phase. In addition or alternatively to this, it may be determined with reference to the detected operating state signals whether a cooling energy consumer is in a normal operating state or in a critical operating state.

The operating-state-dependent priority data stored in the database may be data that are characteristic of the priority to be given to the cooling energy consumers in terms of the cooling energy to be supplied in a normal operating state, in a fault mode state and/or in an operating start-up phase of the cooling system. In addition or alternatively to this, the operating-state-dependent priority data stored in the database may be data that are characteristic of the priority to be given to the cooling energy consumers in terms of the cooling energy to be supplied in a normal operating state and/or in a critical operating state of the cooling energy consumers.

Furthermore, a target temperature of a coolant to be supplied to the cooling energy consumers may be stored for a plurality of cooling energy consumers to be supplied with cooling energy by the cooling system. The target temperature is preferably a desired minimum target temperature of the coolant to be supplied to the cooling energy consumers. The operation of a cold production device of the cooling system may then be controlled in such a manner that the cold production device cools the coolant to be supplied to the cooling energy consumers to a temperature which is adjusted to the lowest stored target temperature of the cooling energy consumers supplied with cooling energy, taking account of the stored operating-state-dependent priority data in a certain operating state of the cooling system and/or of the cooling energy consumers.

The operating-state-dependent priority data are preferably stored for predefined groups of cooling energy consumers to be supplied with cooling energy by the cooling system. The division of the cooling energy consumers into groups may take place independently of the physical location of the cooling energy consumers in the aircraft and facilitates a further simplification of the control logic and makes easier the integration of new cooling energy consumers into the control system in particular.

A cooling system according to the invention, which is suitable, in particular, for use on board an aircraft, comprises a control system described above.

A preferred embodiment of the invention is now described in greater detail with reference to the enclosed schematic figure, which shows the structure in principle of an aircraft cooling system as well as of a control system for controlling the aircraft cooling system.

An aircraft cooling system 100 illustrated in the only figure is equipped with a control system 10 for controlling the operation of the aircraft cooling system 100. The aircraft cooling system 100 comprises a cold production device 12, which is connected via a coolant circuit 14 to a plurality of cooling energy consumers 16a-d, 18a-d, 20a-d. A suitable coolant circulates in the coolant circuit 14 and supplies cooling energy produced by the cold production device 12 to the cooling energy consumers 16a-d, 18a-d, 20a-d. In the embodiment of the aircraft cooling system 100 shown in the figure, the aircraft cooling system 100 only comprises one central cold production device 12. It is also conceivable, however, to equip the aircraft cooling system 100 with several cold production devices 12.

The control system 10 for controlling the aircraft cooling system 100 comprises an operating state detection unit 30. The operating state detection unit 30 detects operating state signals, which are characteristic of the operating state of the aircraft cooling system 100 and in particular of the cold production device 12. For this purpose signals detected by suitable sensors indicating the operating state of the aircraft cooling system 100 and in particular of the cold production device 12 are supplied to the operating state detection unit 30 via a data bus 32. For example, signals can be supplied to the operating state detection unit 30 via the data bus 32 that indicate the speed of compressors present in the cold production device 12. In addition or alternatively to this, signals can be supplied to the operating state detection unit 30 that are characteristic of the temperature in the aircraft cooling system 100 measured preferably at various points on the aircraft cooling system 100. With reference to the signals supplied to it, the operating state detection unit 30 determines the operating state of the aircraft cooling system and in particular the utilization state of the cold production device 12.

Furthermore, signals that are characteristic of the operating state of the cooling energy consumers 16a-d, 18a-d, 20a-d are supplied to the operating state detection unit 30 via a data bus 34. Suitable sensors assigned to the individual cooling energy consumers 16a-d, 18a-d, 20a-d are used for signal detection. With reference to the data supplied to it via the data bus 34, the operating state detection unit 30 can determine the load state and thus the cooling energy requirement of the cooling energy consumers 16a-d, 18a-d, 20a-d, for example.

Finally, signals that are characteristic of the conditions in the environment of the aircraft cooling system 100 are supplied to the operating state detection unit 30 via a data bus 36. For example, signals that are provided by an external temperature sensor, an air humidity sensor or the like and are consequently characteristic of the ambient temperature and the air humidity in the environment of the aircraft cooling system 100 can be supplied to the operating state detection unit 30 via the data bus 36.

With reference to the signals supplied to it, the operating state detection unit 30 can determine the operating state of the aircraft cooling system 100 as well as the operating state of the cooling energy consumers 16a-d, 18a-d, 20a-d. In particular, the operating state detection unit 30 is able to recognize whether the aircraft cooling system 100 is in normal operation or whether a fault is present. The operating state detection unit 30 can further recognize whether the aircraft cooling system 100 is in an operating start-up phase or whether the operation of the aircraft cooling system 10 is being terminated, i.e. the aircraft cooling system 100 is being shut down.

Finally, the operating state detection unit 30 can recognize whether the cooling energy consumers 16a-d, 18a-d, 20a-d are in a normal operating state or in a critical operating state. An operating state of a cooling energy consumer 16a-d, 18a-d, 20a-d is classed by the operating state detection unit 30 as a normal operating state if the cooling energy consumer 16a-d, 18a-d, 20a-d is working normally and if a desired reduction in the cooling energy consumption of the cooling energy consumer 16a-d, 18a-d, 20a-d in a certain operating state of the aircraft cooling system 100 is not critical for the operation of the aircraft. By contrast, a critical operating state of a cooling energy consumer 16a-d, 18a-d, 20a-d is recognized if damage threatens the cooling energy consumer 16a-d, 18a-d, 20a-d due to a lack of cooling, but a reduction in power of the cooling energy consumer 16a-d, 18a-d, 20a-d or switching off of the cooling energy consumer 16a-d, 18a-d, 20a-d is not possible without jeopardizing the operating safety of the aircraft. The operating state detection unit 30 can also draw on the data indicating ambient conditions when assessing the operating state of the cooling energy consumers 16a-d, 18a-d, 20a-d.

As can be recognized in the figure, the cooling energy consumers 16a-d, 18a-d, 20a-d are divided into three groups in the aircraft cooling system 100 shown. The division of the cooling energy consumers 16a-d, 18a-d, 20a-d into groups can take place independently of the physical location of the cooling energy consumers 16a-d, 18a-d, 20a-d in the aircraft. The cooling energy consumers 16a-d assigned to a first group are components which fulfil safety-relevant functions for the operation of an aircraft equipped with the aircraft cooling system 100. The first group of cooling energy consumers 16a-d includes for example an avionic system of the aircraft as well as further electronic components that are highly relevant for the operation of the aircraft. It is of the utmost importance, therefore, in the operation of the aircraft that the cooling energy consumers 16a-d collected in the first group are always supplied with adequate cooling energy by the aircraft cooling system 100.

Collected in a second group are cooling energy consumers 18a-d, which do not have to be supplied so compulsorily with cooling energy as the cooling energy consumers 16a-d in the first group in normal operation of the aircraft cooling system 100 and if a fault occurs in the operation of the aircraft cooling system 100, but should not nevertheless be neglected. During an operating start-up phase of the aircraft cooling system 100 it is not crucial, however, that the cooling energy consumers 18a-d of the second group are supplied as quickly as possible with cooling energy. Rather it is sufficient if cooling energy is supplied to the cooling energy consumers 18a-d of the second group only in a later operating phase of the aircraft cooling system 100.

Finally, cooling energy consumers 20a-d that fulfil less important functions for the operation of the aircraft are collected in a third group. The cooling energy consumers 20a to 20d of the third group can be entertainment electronics components, for example, or components only serving the comfort of the passengers on board an aircraft. In the start-up operating phase of the aircraft cooling system 100, these components should be supplied with cooling energy as quickly as possible, however, to prevent damage to the components from overheating.

The control system 10 further comprises a database 38. Stored in the database 38 are operating-state-dependent priority data for the various groups of cooling energy consumers 16a-d, 18a-d, 20a-d, which data are characteristic of the priority to be given to the cooling energy consumers 16a-d, 18a-d, 20a-d in terms of the cooling energy to be supplied in various operating states of the aircraft cooling system 100 and/or of the cooling energy consumers 16a-d, 18a-d, 20a-d. In other words, stored in the database 38 for the first group of cooling energy consumers 16a-d are priority data from which it emerges that highest priority, i.e. a priority of 1, is always to be given to the cooling energy consumers 16a-d in all operating states of the aircraft cooling system 100.

For the second group of cooling energy consumers 18a-d by contrast, the database 38 contains data from which it emerges that a medium priority, i.e. a priority of 2, is to be given to the cooling energy consumers 18a-d in normal operation of the aircraft cooling system 100 and when a fault occurs in the aircraft cooling system 100. In these operating states of the aircraft cooling system 100, the cooling energy consumers 18a to 18d are consequently prioritized in terms of the cooling energy to be supplied compared with the cooling energy consumers 20a-d of the third group. By contrast, on start-up of the aircraft cooling system 100 it is not necessary to cool the cooling energy consumers 18a-d of the second group immediately. The database 38 contains corresponding data, therefore, that show that the cooling energy consumers 18a-d are only to be given a lower-level priority, i.e. a priority of 3, on start-up of the aircraft cooling system 10.

For the cooling energy consumers 20a-d of the third group, the database 38 contains data that indicate a lower-level priority (priority 3) of the cooling energy consumers 20a-d in terms of the cooling energy to be supplied for the normal operating state as well as a fault mode state of the aircraft cooling system 100. On start-up of the aircraft cooling system 100, on the other hand, the cooling energy consumers 20a-d of the third group are prioritized (priority 2) in terms of the cooling energy to be supplied compared with the cooling energy consumers 18a-d of the second group.

The database 38 further contains data that are characteristic of the priority to be given to the cooling energy consumers 16a-d, 18a-d, 20a-d in terms of the cooling energy to be supplied in a normal operating state and in a critical operating state of the cooling energy consumers 16a-d, 18a-d, 20a-d. In other words, the operating-state-dependent priority data stored in the database 38 take account of the operating state of the cooling energy consumers 16a-d, 18a-d, 20a-d in addition to the operating state of the cooling system 100.

Finally, a desired minimum target temperature of the coolant supplied to the cooling energy consumers 16a-d, 18a-d, 20a-d via the coolant circuit 14 is stored in the database 38 for the cooling energy consumers 16a-d, 18a-d, 20a-d. For the first group of cooling energy consumers 16*a-d* this target temperature is 20° C., for the second group of cooling energy consumers 18*a-d* it is -9° C. and for the third group of cooling energy consumers 20*a-d* it is 0° C. The target temperatures stored in the database 38 for the three groups of cooling energy consumers 16*a-d*, 18*a-d*, 20*a-d* each reproduce the temperature that the coolant circulating in the coolant circuit 14 for cooling the individual groups of cooling energy consumers 16*a-d*, 18*a-d*, 20*a-d* would ideally have if only one group of cooling energy consumers 16*a-d*, 18*a-d*, 20*a-d* had to be supplied with cooling energy. This means that if only the first group of cooling energy consumers 16*a-d* had to be supplied with cooling energy, the coolant would ideally have a temperature of 20° C., whereas if only the second group of cooling energy consumers 18*a-d* had to be supplied with cooling energy, a coolant temperature of -9° C. would be optimal. If exclusively supplying the third group of cooling energy consumers 20*a-d*, the ideal coolant temperature would be 0° C.

The control system 10 lastly comprises a control signal generation unit 40. Depending on the operating state signals generated by the operating state detection unit 30, the control signal generation unit 40 produces control signals, which control the supply of cooling energy to the various groups of cooling energy consumers 16*a-d*, 18*a-d*, 20*a-d*. As well as the operating state of the aircraft cooling system 100, the operating-state-dependent priority data filed in the database 38 are also taken into account. Finally, when generating control signals, the signal generation unit 40 can, if desired or necessary, take account of signals indicating the operating state of the individual cooling energy consumers 16*a-d*, 18*a-d*, 20*a-d* and/or signals characteristic of the ambient conditions. For example, a cooling energy consumer 16*a-d*, 18*a-d*, 20*a-d*, which only has a lower-level priority in terms of the cooling energy to be supplied in a certain operating state of the aircraft cooling system 100, can nevertheless be supplied with cooling energy if a set maximum temperature of the cooling energy consumer 16*a-d*, 18*a-d*, 20*a-d* is exceeded and damage to the cooling energy consumer 16*a-d*, 18*a-d*, 20*a-d* is directly imminent, but a reduction in the output of the cooling energy consumer 16*a-d*, 18*a-d*, 20*a-d* or switching off of the cooling energy consumer 16*a-d*, 18*a-d*, 20*a-d* is not possible without jeopardizing the operating safety of the aircraft.

The control signals generated by the control signal generation unit 40 are routed via a data bus 42 to the cold production device 12 of the aircraft cooling system 100. Control signals generated by the control signal generation unit 40 can be supplied to the individual groups of cooling energy consumers 16*a-d*, 18*a-d*, 20*a-d* via a data bus 46.

The control signals generated by the control signal generation unit 40 are used to control the cooling energy consumption of the cooling energy consumers 16*a-d*, 18*a-d*, 20*a-d* as desired. For example, the maximum temperature of the coolant following the delivery of its cooling energy to the cooling energy consumers 16*a-d*, 18*a-d*, 20*a-d* can be limited under the control of the control system 10.

The control signals generated by the control signal generation unit 40 can be supplied directly to the cooling energy consumers 16*a-d*, 18*a-d*, 20*a-d*. Alternatively to this, it is also conceivable, however, to supply the control signals generated by the control signal generation unit 40 to local controllers assigned to the individual cooling energy consumers 16*a-d*, 18*a-d*, 20*a-d* or to the individual groups of cooling energy consumers 16*a-d*, 18*a-d*, 20*a-d*. Furthermore, only the operation of the cold production device 12 and the distribution of the cooling energy produced by the cold production device 12 to the cooling energy consumers 16*a-d*, 18*a-d*, 20*a-d* can be controlled under the control of the control system 10. In addition to this, it is also conceivable, however, to exert an influence on the operation of the cooling energy consumers 16*a-d*, 18*a-d*, 20*a-d*, i.e. for example to reduce the output of a cooling energy consumer 16*a-d*, 18*a-d*, 20*a-d* if this cooling energy consumer 16*a-d*, 18*a-d*, 20*a-d* is supplied with little cooling energy.

Furthermore, the control system 10 controls the operation of the cold production device 12 such that the cold production device 12 cools the coolant to be supplied to the cooling energy consumers 16*a-d*, 18*a-d*, 20*a-d* to a temperature that is adjusted to the lowest target temperature stored in the database 38 for a group of cooling energy consumers 16*a-d*, 18*a-d*, 20*a-d*, which is supplied with cooling energy taking account of the operating-state-dependent priority data stored in the database 38 in a certain operating state of the aircraft cooling system 100 and/or of the cooling energy consumers 16*a-d*, 18*a-d*, 20*a-d*. In particular, the cold production device 12 is controlled by the control system 10 in such a manner that the coolant temperature corresponds to the lowest coolant temperature target temperature of the groups of cooling energy consumers 16*a-d*, 18*a-d*, 20*a-d* currently supplied with cooling energy.

The invention claimed is:

1. A system for controlling a cooling system, adapted for use on board an aircraft, the cooling system comprising a cold production device to produce and supply a coolant to a plurality of energy consuming components, wherein the system comprises:
   an operating state detection unit, which is adapted to detect operating state signals, which are characteristic of an operating state of the cooling system;
   one or more sensors in electrical communication with the operating state detection unit and the energy consuming components;
   a database, in which operating-state-dependent priority data are stored for the plurality of energy consuming components to be supplied with coolant by the cooling system, the priority data are characteristic of a priority to be given to the energy consuming components in terms of the coolant to be supplied from the cold production device in various operating states of the cooling system, wherein the stored priority data for at least one of the energy consuming components is arranged so as to cause that energy consuming component to always be given a highest priority in all operating states of the cooling system and regardless of an operating state of other ones of the energy consuming components; and
   a control signal generation unit, which is adapted to generate a first to third control signals in accordance with the operating state signals detected by the operating state detection unit and the priority data stored in the database, the first control signals being routed to the cold production device for controlling operation of the cold production device, the second control signal being supplied to components of the cooling system for controlling a distribution of the coolant produced by the cold production device to the energy consuming components, and the third control signal being supplied to the energy consuming components or local controllers assigned to the energy consuming components, the third control signal exerting influence on an operation of the energy consuming components in response to detection and feedback of performance parameters of the operating state of the energy consuming components by the one or more sensors, so as to control cooling to the plurality of energy consuming components.

2. System according to claim 1, wherein the operating state detection unit is adapted to determine with reference to the detected operating state signals whether the cooling system is in a normal operating state, in a fault mode state, or in an operating startup phase, and/or whether a energy consuming components is in a normal operating state or in a critical operating state.

3. System according to claim 1, wherein at least some of the operating-state-dependent priority data stored in the database are data that are characteristic of the priority to be given to the energy consuming components in terms of the coolant to be supplied in a normal operating state, in a fault mode state, and/or in an operating start-up phase of the cooling system, and/or wherein at least some of the operating-state-dependent priority data stored in the database are data that are characteristic of the priority to be given to the energy consuming components in terms of the coolant to be supplied in a normal operating state and/or in a critical operating state of the energy consuming components.

4. System according to claim 1, wherein stored in the database for a plurality of energy consuming components to be supplied with coolant by the cooling system is a target temperature of a coolant to be supplied to the energy consuming components and that the control system is adapted to control the operation of the cold production device of the cooling system in such a manner that the cold production device cools the coolant to be supplied to the energy consuming components to a temperature that is adjusted to a lowest target temperature stored in the database of the energy consuming components supplied with coolant taking account of the operating-state-dependent priority data stored in the database in a certain operating state of the cooling system and/or of the energy consuming components.

5. System according to claim 1, wherein the operating-state-dependent priority data are stored in the database for predefined groups of energy consuming components to be supplied with coolant by the cooling system.

6. A method for controlling a cooling system, adapted for use on board an aircraft, the cooling system comprising a cold production device producing coolant supplied to a plurality of energy consuming components, the method comprising the steps:
detecting operating state signals, which are characteristic of an operating state of the cooling system wherein the detecting includes one or more sensors associated with the energy consuming components;
storing operating-state-dependent priority data for the plurality of energy consuming components to be supplied with coolant by the cooling system, the operating-state-dependent priority data are characteristic of a priority to be given in terms of the coolant to be supplied from the cold production device to the energy consuming components in various operating states of the cooling system and/or of the energy consuming components, wherein the stored operating-state-dependent priority data for at least one of energy consuming components is arranged so as to cause the at least one energy consuming component to always be given a highest priority in all operating states of the cooling system and regardless of an operating state of other ones of the energy consuming components;
generating a first to third control signals in accordance with the detected operating state signals and the stored priority data;
routing the first control signals to the cold production device for controlling operation of the cold production device;
supplying the second control signal to components of the cooling system controlling a distribution of the coolant produced by the cold production device to the energy consuming components; and
supplying the third control signal to the energy consuming components or local controllers assigned to the energy consuming components, the third control signal exerting influence on an operation of the energy consuming components based on detection and feedback of performance parameters of the operating state of the energy consuming components by the one or more sensors, so as to produce and supply coolant to a plurality of energy consuming components.

7. Method according to claim 6, wherein it is determined with reference to the detected operating state signals whether the cooling system is in a normal operating state, in a fault mode state, or in an operating start-up phase, and/or whether a component is in a normal operating state or in a critical operating state.

8. Method according to claim 6, wherein at least some of the stored operating-state-dependent priority data are data that are characteristic of a priority to be given to the energy consuming components in a normal operating state, in a fault mode state, and/or in an operating start-up phase of the cooling system, and/or wherein at least some of the operating-state-dependent priority data stored in the database are data that are characteristic of a priority to be given in terms of the coolant to be supplied to the energy consuming components in a normal operating state and/or in a critical operating state of the energy consuming components.

9. Method according to claim 6, wherein a target temperature of a coolant to be supplied to the energy consuming components is stored for the plurality of energy consuming components to be supplied with coolant by the cooling system, and that the operation of the cold production device of the cooling system is controlled in such a manner that the cold production device cools the coolant to be supplied to the energy consuming components is to a temperature that is adjusted to a lowest stored target temperature of the energy consuming components supplied with coolant taking account of the stored operating-state-dependent priority data in a certain operating state of the cooling system and/or of the energy consuming components.

10. Method according to claim 6, wherein the operating-state-dependent priority data is stored for predefined groups of energy consuming components to be supplied with coolant by the cooling system.

11. A cooling system, adapted and arranged for use on board an aircraft, the cooling system comprising a control system according to claim 1.

* * * * *